(12) United States Patent
Wong (10) Patent No.: US 12,491,471 B2
(45) Date of Patent: Dec. 9, 2025

(54) FRESHWATER HARVESTING ASSEMBLY UTILIZING WATER-SORPTION MATERIAL WITHIN HIERARCHICAL COMPONENT

(71) Applicant: Shing-Chung Josh Wong, Akron, OH (US)

(72) Inventor: Shing-Chung Josh Wong, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 618 days.

(21) Appl. No.: 17/799,454

(22) PCT Filed: Feb. 11, 2021

(86) PCT No.: PCT/US2021/017609
§ 371 (c)(1),
(2) Date: Aug. 12, 2022

(87) PCT Pub. No.: WO2021/163290
PCT Pub. Date: Aug. 19, 2021

(65) Prior Publication Data
US 2023/0084610 A1 Mar. 16, 2023

Related U.S. Application Data

(60) Provisional application No. 62/976,462, filed on Feb. 14, 2020.

(51) Int. Cl.
*B01D 53/26* (2006.01)
*B01D 5/00* (2006.01)
(Continued)

(52) U.S. Cl.
CPC ......... *B01D 53/261* (2013.01); *B01D 5/0006* (2013.01); *B01D 53/04* (2013.01);
(Continued)

(58) Field of Classification Search
CPC .... F24F 2140/30; E03B 3/28; B01D 2257/80; B01D 2253/204; B01D 2253/202;
(Continued)

(56) References Cited

U.S. PATENT DOCUMENTS 5,435,151 A * 7/1995 Han ..................... B01D 1/0017
62/239
6,336,957 B1 1/2002 Tsymerman
(Continued)

FOREIGN PATENT DOCUMENTS

CN 102162191 8/2011
EP 2782668 B1 * 12/2016 ............. B01D 53/02

OTHER PUBLICATIONS

Machine English language translation of EP2782668 to Giebelhausen et al. Translated May 2025 (Year: 2016).*
(Continued)

*Primary Examiner* — Cassey D Bauer
(74) *Attorney, Agent, or Firm* — RENNER KENNER GREIVE BOBAK TAYLOR & WEBER (57) ABSTRACT

A freshwater harvesting assembly includes a micro-scale component selected from a polymer, a foam, and a membrane; a water-sorption material selected from metal-organic framework (MOF), nanosilica gel, and superabsorbent polymer; wherein the water-sorption material is incorporated within the micro-scale component to thereby provide a water-sorption-material-containing micro-scale component; and a housing carrying the water-sorption-material-containing micro-scale component.

9 Claims, 4 Drawing Sheets

(51) Int. Cl.
  *B01D 53/04* (2006.01)
  *B01D 53/28* (2006.01)
  *E03B 3/28* (2006.01)
(52) U.S. Cl.
  CPC ........... *B01D 53/265* (2013.01); *B01D 53/28* (2013.01); *E03B 3/28* (2013.01); *B01D 2253/106* (2013.01); *B01D 2253/202* (2013.01); *B01D 2253/204* (2013.01); *B01D 2257/80* (2013.01)
(58) Field of Classification Search
  CPC .............. B01D 2253/106; B01D 23/28; B01D 53/265; B01D 53/28; B01D 53/04; B01D 5/0006; B01D 53/261
  USPC .............................. 62/94, 272, 281; 165/133
  See application file for complete search history.

(56) References Cited

U.S. PATENT DOCUMENTS

| | | |
|---|---|---|
| 6,960,243 B1 | 11/2005 | Smith et al. |
| 7,043,934 B2 | 5/2006 | Radermacher et al. |
| 8,627,673 B2 | 1/2014 | Hill et al. |
| 8,882,888 B2 | 11/2014 | Ball et al. |
| 9,038,409 B2 | 5/2015 | Hwang et al. |
| 9,132,382 B2 | 9/2015 | Goelet |
| 9,140,396 B2 | 9/2015 | Kohavi et al. |
| 9,200,434 B2 | 12/2015 | Lehky |
| 2008/0314062 A1 | 12/2008 | Ritchey |
| 2017/0232383 A1 | 8/2017 | Yeung et al. |
| 2018/0171604 A1* | 6/2018 | Kim .................... B01J 20/3204 |
| 2018/0209123 A1 | 7/2018 | Bahrami et al. |
| 2019/0234053 A1 | 8/2019 | Kim et al. |

OTHER PUBLICATIONS

Written Opinion of international application PCT/US2021/017609 dated Apr. 12, 2021.

International Search Report of international application PCT/US2021/017609 dated Apr. 12, 2021.

Huang et al.; Electrospinning polyvinylidene fluoride/expanded graphite composite membranes as high efficiency and reusable water harvester; Materials Letters 202 (2017) 78-81; Available online May 17, 2017.

Logan et al.; Reversible Atmospheric Water Harvesting Using Metal-Organic Frameworks; Scientific Reports; (2020) 10:1492; Published online: Jan. 30, 2020.

Furukawa et al.; Water Adsorption in Porous Metal-Organic Frameworks and Related Materials; J. Am. Chem. Soc. 2014, 136, 4369-4381; Published Mar. 3, 2014.

Knisely; Engineering professor to present freshwater research at ACS national meeting; UA in the News; Aug. 21, 2018 (accessed Jan. 28, 2021).

* cited by examiner

FRESHWATER HARVESTING ASSEMBLY UTILIZING WATER-SORPTION MATERIAL WITHIN HIERARCHICAL COMPONENT

CROSS-REFERENCE TO RELATED APPLICATIONS

This application claims the benefit of U.S. Provisional Application No. 62/976,462, filed on Feb. 14, 2020, which is incorporated herein by reference.

FIELD OF THE INVENTION

Embodiments of the present invention relate to a freshwater harvesting assembly utilizing a water-sorption material within a multi-scale hierarchical component. The water-sorption material may be one or more of metal-organic framework (MOF), nanosilica gel, and superabsorbent polymer.

BACKGROUND OF THE INVENTION

Freshwater scarcity is an emergency for many of the most populated and arid regions in the world. Only about 2.5% of the water sources on earth are freshwater. And much of that freshwater is locked within ice in the north and south poles.

In most parts of the planet, the fog and humidity in air may become the only alternative and abundant source of fresh water for decentralized living. Organisms and human beings living in these areas without watershed and fresh water have some strategies for collecting airborne water molecules in the atmosphere.

These strategies have been studied and researchers have found the water collection efficiency is dominated by two steps: the condensation and growth of water droplets, and the gravity-driven falling of the grown droplets. As such, high-speed condensation and growth, and fast removal of large sized droplets, become the key factors for enhancing the water harvesting ability.

Certain bio-inspired water collectors have been made from superhydrophobic material with special surface modification. Some show good capability and high-efficient removal of condensed water droplets after wetting. However, efficiency with regard to the water condensing action and simplifying the manufacturing process remain a challenge for developing a high-performance water harvester.

Some areas have begun to utilize cloud seeding, or weather modification technology, which aims to change the amount or type of precipitation that falls from clouds by dispersing substances into the air. These substances serve as cloud condensation or ice nuclei. However, whether cloud seeding is effective in producing a statistically significant increase in precipitation is still a matter of academic debate. There are contrasting results depending on the study, and there are contrasting opinions among experts. Cloud seeding may generate disruption of habitat and impact climate change, and there may also be environment and health concerns with the dispersed substances that are utilized.

There remains a need in the art for an improved, decentralized freshwater harvester for human beings to have access to freshwater.

SUMMARY OF THE INVENTION

An embodiment of the present invention provides a freshwater harvesting assembly comprising a micro-scale component selected from a polymer, a foam, and a membrane; a water-sorption material selected from metal-organic framework (MOF), nanosilica gel, and superabsorbent polymer; wherein the water-sorption material is incorporated within the micro-scale component to thereby provide a water-sorption-material-containing micro-scale component; and a housing carrying the water-sorption-material-containing micro-scale component.

Another embodiment of the present invention provides a freshwater harvesting assembly as in any embodiment above, wherein the housing is an evaporator of a vapor compression refrigeration cycle system.

Another embodiment of the present invention provides a freshwater harvesting assembly as in any embodiment above, the evaporator including coils having interstices therebetween, wherein the micro-scale component is provided within the interstices between the coils.

Another embodiment of the present invention provides a freshwater harvesting assembly as in any embodiment above, wherein the housing is selected from a backpack, a cup, and a vehicle, the vehicle being selected from automobiles, watercraft, aircraft, aerial drones, and sea drones.

Another embodiment of the present invention provides a freshwater harvesting assembly as in any embodiment above, wherein the freshwater harvesting assembly is capable of collecting at least 0.5 gallons of water per hour.

Another embodiment of the present invention provides a freshwater harvesting assembly as in any embodiment above, wherein the freshwater harvesting assembly is capable of collecting at least 10 gallon of water per hour.

Another embodiment of the present invention provides a freshwater harvesting assembly as in any embodiment above, wherein the water-sorption material is the metal-organic framework.

Another embodiment of the present invention provides a freshwater harvesting assembly as in any embodiment above, wherein the water-sorption material is metal-organic framework selected from the group consisting of MOF-841, Cr-MIL-101, Co2Cl2(BTDD), Zr-MOF-808, Al-MIL-53, Ti-MIL-125, Zr-UiO-66, Ti-MIL-125-NH2, Zr-UiO-66-NH2, Zn-ZIF-8, and Cu-HKUST-1.

Another embodiment of the present invention provides a freshwater harvesting assembly as in any embodiment above, wherein the water-sorption material includes from 60 wt. % to 80 wt. % of the metal-organic framework and from 20 wt. % to 40 wt. % of either the nanosilica gel or the superabsorbent polymer.

Another embodiment of the present invention provides a freshwater harvesting assembly as in any embodiment above, wherein the micro-scale component is the polymer, wherein the polymer is selected from electrospun polymer fibers and gel spun polymer fibers.

Another embodiment of the present invention provides a freshwater harvesting assembly as in any embodiment above, wherein the micro-scale component is the foam, wherein the foam is a microcellular foam having bubbles with an average size of less than 50 microns wide.

Another embodiment of the present invention provides a freshwater harvesting assembly as in any embodiment above, wherein the freshwater harvesting assembly is powered by a green energy source selected from wind energy and solar energy.

Another embodiment of the present invention provides a freshwater harvesting assembly as in any embodiment above, comprising a cup housing having a sidewall extending between a closed bottom end and an open top end; a storage location coupled with the cup housing; the storage location including a water-sorption-material-containing micro-scale component comprising a micro-scale component selected from a polymer, a foam, and a membrane; and a water-sorption material incorporated within the micro-scale component, wherein the water-sorption material is selected from metal-organic framework (MOF), nanosilica gel, and superabsorbent polymer.

Another embodiment of the present invention provides a freshwater harvesting assembly as in any embodiment above, further comprising a water collection tube having a first opening within the storage location and a second opening outside the storage location, to thereby allow collected water to pass from the storage location to the closed bottom end of the cup housing.

Another embodiment of the present invention provides a method of harvesting freshwater, the method comprising steps of providing a spinnable composition or a foamable composition including water-sorption-material-containing; spinning the spinnable composition or foaming the foamable composition to thereby form a water-sorption-material-containing micro-scale component selected from a polymer and a foam; and incorporating the water-sorption-material-containing micro-scale component within a housing.

Another embodiment of the present invention provides a method as in any embodiment above, further comprising steps of allowing the water-sorption-material-containing micro-scale component within the housing to adsorb and/or absorb water from water-vapor-containing air as retained water; allowing the water-sorption-material-containing micro-scale component within the housing to desorb the retained water as desorbed water; and collecting the desorbed water for a suitable use.

Another embodiment of the present invention provides a method as in any embodiment above, further comprising a step of storing the desorbed water for a timeframe of at least 1 hour.

Another embodiment of the present invention provides a method as in any embodiment above, further comprising a step of storing the desorbed water for a timeframe of at least 1 week.

Another embodiment of the present invention provides a method as in any embodiment above, wherein the housing is part of a moving vehicle, such that the water-vapor-containing air includes wind that is constantly encountered by the moving vehicle.

Another embodiment of the present invention provides a method as in any embodiment above, further comprising a step of powering the housing by a green energy source selected from wind energy and solar energy.

DETAILED DESCRIPTION OF ILLUSTRATIVE EMBODIMENTS

Advantages of the present invention will become better understood with regard to the following description, appended claims, and accompanying drawings wherein:

DETAILED DESCRIPTION OF ILLUSTRATIVE EMBODIMENTS

Embodiments of the present invention relate to a freshwater harvesting assembly utilizing a water-sorption material within a hierarchical component. The water-sorption material may be one or more of metal-organic framework (MOF), nanosilica gel, and superabsorbent polymer.

While certain water-sorption materials, such as MOF, have been utilized previously for the capture of atmospheric water, embodiments of the present invention advantageously utilize the hierarchical component in order to further miniaturize a freshwater harvesting assembly. The freshwater harvesting assembly, which may also be referred to as a water collection unit, of the present invention produces significant amount of water in a relatively short time. Moreover, the water collection units are miniaturized, on the order of personal-use size, such that an individual user can collect and use freshwater from one of the water collection units. The water collection units of one or more embodiments of the present invention are agile, lightweight, and mobile, and in one or more embodiments have water harvesting capabilities ranging from 0.5 to 10 gallons per hour. Generally speaking, the more miniaturized the water harvesting unit is, the more decentralized the water harvesting capacity becomes. Instead of relying on a central government doling out or apportioning water, the present invention seeks to provide a decentralized water harvesting unit that is affordable for people who need clean and drinking water, particularly for use in harsh environments. The hierarchical structure, of the hierarchical component described herein, is technically advantageous for miniaturizing a water harvesting unit.

As suggested above, the water-sorption material of the water harvesting unit may be metal-organic framework. A metal-organic framework is a coordination network with organic ligands, where the network generally contains high porosity, which may be referred to as including voids or pores within the network. Certain MOF are sensitive to water in the air, which can cause degradation of the MOF. As an example, IRMOF-1 (IRMOF=isoreticular metal-organic framework) can degrade in the presence of a small amount of water, even at room temperature.

However, other MOF and other water-sorption materials include stable pores that can be filled with other compounds, such as water. In one or more embodiments of the present invention, these water-sorption materials can be used for sorption (i.e. adsorption and/or absorption) of the water from the air, thereby collecting a suitable amount of water within the water-sorption material. This collected water can then be extracted from the water-sorption material for use, such as for consumption of the water. Advantageously, one or more embodiments of the present invention provide the water-sorption material within a hierarchical component. It should be appreciated that the sorption of water into the water-sorption material occurs at a molecular scale. That is, the water-sorption material are molecules, though they are spacious molecules, and therefore a practical application of the water-sorption material generally requires a large number of the water-sorption material molecules.

Advantageously, a large number of the water-sorption material molecules are incorporated within a polymer, a foam, or a membrane acting as the hierarchical component. That is, the molecular-scale water-sorption material molecules are incorporated into a micro-scale component (e.g. polymer, foam, membrane), which may also be referred to as a multiscale component. This integration of a smaller scale component (e.g. water-stable MOF molecules) into a relatively larger scale component (e.g. micro-scale component of polymer, foam, or membrane) may be considered as a hierarchical transition, which thereby provides reference herein to the hierarchical component, which may also be referred to as a linking multi-scale assembly. The micro-scale component may be further incorporated into a housing to thereby form a freshwater harvesting assembly. In one or more embodiments, the freshwater harvesting assembly may utilize a traditional heat exchange cycle, such as the vapor compression refrigeration cycle. In other embodiments, other suitable techniques for nanoscale or microscale heat transportation may be utilized. In one or more embodiments, the freshwater harvesting assembly may be powered by a green energy source (e.g. wind energy or solar energy).

As suggested above, various suitable water-sorption materials may be utilized. This may include one or more of metal-organic framework (MOF), nanosilica gel, and superabsorbent polymer.

Various metal-organic frameworks (MOF) may be utilized. As suggested above, suitable metal-organic frameworks are those that include a coordination network with organic ligands, which may also be referred to as linkers, where the coordination network includes stable pores that can be filled with another compound, such as water. The skilled person will be aware of suitable MOF that are stable with respect to water. The MOF may also be referred to as molecular 3D structures with a high degree of porosity. More specifically, a metal ion or a cluster of metal ions is coordinated to the organic ligands, which can be in a one-dimensional, two-dimensional, or three-dimensional structure. As further described herein, the MOF, which may also be referred to as water-stable MOF, can be used to adsorb and/or absorb water from the air to collect water within the water-stable MOF for subsequent expulsion of the water.

The organic ligands may be monovalent ligands, divalent ligands, trivalent ligands, tetravalent ligands, and combinations thereof. The choice of metal for the metal ion or the cluster of metal ions, and the choice of organic ligands, dictate the structure and therefore the properties of the MOF. As an example, the coordination preference of the metal affects the size and shape of the pores by dictating how many ligands can bind to the metal and in which orientation.

Exemplary ligand linkers for the MOF include benzene-1,3,5-tricarboxylic acid (H3BTC), benzene-1,4-dicarboxylic acid (H2BDC), bis(1H-1,2,3-triazolo[4,5-b],[4',5'-i]) dibenzo[1,4]dioxin (H2BTDD).

The MOF generally include subunits, which may be referred to as secondary building units (SBU), that can be described by topologies common to several structures of the MOF. Each topology, which may also be referred to as a net, may be assigned a symbol that includes three lower-case letters. Bridging ligands are generally attached to the SBUs. Exemplary bridging ligands can include dicarboxylic acids and tricarboxylic acids. The bridging ligands generally have rigid backbones, with examples including benzene-1,4-dicarboxylic acid (BDC or terephthalic acid), biphenyl-4,4'-dicarboxylic acid (BPDC), and the tricarboxylic acid trimesic acid.

The various suitable metal-organic frameworks can include various molecular functionalities that can be fine-tuned to different water adsorbing and/or absorbing capacities.

The MOF may be in powder form. The powder form might be obtained from conventional synthesis methods that produce loose powders of the MOFs that may include small crystallites with limited packing densities. The powder form may also be referred to as fine microcrystalline powder. Based on some of the drawback of attempting to use this powder form in practical applications, and as will be further discussed below, one or more embodiments of the present invention include incorporating MOF powder into a hierarchical component which also preserves the intrinsic properties of the MOF powder.

The MOF powder form may be characterized by average surface area thereof. In one or more embodiments, average surface area of the MOF powder is from 100 $m^2/g$ to 10,000 $m^2/g$, in other embodiments, from 700 $m^2/g$ to 3,000 $m^2/g$, and in other embodiments, from 800 $m^2/g$ to 1,500 $m^2/g$, as measured by BET technique.

The MOF powder form may be characterized by average pore volume thereof. In one or more embodiments, average pore volume of the MOF powder is from 0.25 $cm^3/g$ to 1.0 $cm^3/g$, in other embodiments, from 0.35 $cm^3/g$ to 0.9 $cm^3/g$, and in other embodiments, from 0.4 $cm^3/g$ to 0.6 $cm^3/g$.

The MOF powder form may be characterized by water uptake, which may differ at various at specific relative pressures ($P/P_0$, where $P_0$ is the saturation pressure of water).

At $P/P_0$ of 0.1, the MOF powder form may be characterized by a water uptake of from 10 $cm^3/g$ to 100 $cm^3/g$, in other embodiments, from 100 $cm^3/g$ to 600 $cm^3/g$, and in other embodiments, from 300 $cm^3/g$ to 600 $cm^3/g$.

At $P/P_0$ of 0.3, the MOF powder form may be characterized by a water uptake of from 10 $cm^3/g$ to 100 $cm^3/g$, in other embodiments, from 100 $cm^3/g$ to 700 $cm^3/g$, and in other embodiments, from 250 $cm^3/g$ to 700 $cm^3/g$.

At $P/P_0$ of 0.9, the MOF powder form may be characterized by a water uptake of from 100 $cm^3/g$ to 1,000 $cm^3/g$, in other embodiments, from 300 $cm^3/g$ to 900 $cm^3/g$, and in other embodiments, from 500 $cm^3/g$ to 800 $cm^3/g$.

Exemplary particular MOF include MOF-841, Cr-MIL-101, $Co_2Cl_2$(BTDD), Zr-MOF-808, Al-MIL-53, Ti-MIL-125, Zr-UiO-66, Ti-MIL-125-$NH_2$, Zr-UiO-66-$NH_2$, Zn-ZIF-8, and Cu-HKUST-1.

Regarding MOF-841, this material is stable in water and does not lose its capacity after five cycles of sorption and desorption. Moreover, MOF-841 may be easily regenerated at room temperature. Because Zr is present in the structure, it is possible to achieve high water uptake at low relative pressure. And since the water uptake does not depend on the presence of strong binding sites in the structure, regeneration can be carried out at room temperature. MOF-841 has a surface area around 1390 $m^2/g$ (BET) and a water uptake of 550 $cm^3/g$ at a $P/P_0$ of 0.3. In addition to the presence of highly charged metals such as Zr+4, Ti+4 and Hf+4 also tend to form highly stable MOFs in water.

Regarding Cr-MIL-101, this material is a mesoporous material that might be particularly useful for water uptake in systems with certain relative humidity, such as from 25% to 65%, though it may also be used with other relative humidity. A main feature of Cr-MIL-101 is the high stability where it maintains its sorption and desorption capacity even after many cycles.

Regarding $Co_2Cl_2(BTDD)$, this material also has a high water uptake capacity. The water adsorption isotherm has an inflection point at $P/P_0=0.29$ and low regeneration energy could be expected. In one or more embodiments, after 30 cycles of use, $Co_2Cl_2(BTDD)$ showed a 6% reduction in adsorption capacity.

Other suitable MOF may be disclosed in the reference articles "Water Adsorption in Porous Metal-Organic Frameworks and Related Materials" (J. Am. Chem. Soc. 2014, 136, 4369-4381), and "Reversible Atmospheric Water Harvesting Using Metal-Organic Frameworks" (Scientific Reports, Volume 10, Article number: 1492; 2020) which are each incorporated herein by reference.

In one or more embodiments, the water-sorption material may include nanoscale silica gel, which may also be referred to as nanosilica gel. The nanoscale silica gel may be a partial or entire amount of the water-sorption material. Nanoscale silica gel is a reusable desiccant with the application of heat. Other details related to nanoscale silica gel are generally known to the skilled person.

In one or more embodiments, the water-sorption material may include superabsorbent polymer. In other embodiments, other highly hygroscopic particles that can be exfoliated and dispersed in 3D media can also be used. The superabsorbent polymer or other highly hygroscopic particles may be a partial or entire amount of the water-sorption material. Superabsorbent polymers absorb water through hydrogen bonding with the water molecules. Exemplary materials for superabsorbent polymer are polyurethane-based hydrogels, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile. Other details related to superabsorbent polymer and other highly hygroscopic particles are generally known to the skilled person.

The relative amounts of the different types of water-sorption material can be selected based on the desired water harvesting capacities. As suggested above, each of the different types may constitute 100% of the water-sorption material.

In other embodiments, a mixture of the different types of the water-sorption material may be utilized.

In one or more embodiments, a micro-scale component may include from 20 wt. % to 90 wt. %, in other embodiments, from 60 wt. % to 80 wt. %, in other embodiments, from 70 wt. % to 90 wt. %, in other embodiments, from 30 wt. % to 70 wt. %, in other embodiments, from 90 wt. % to 99 wt. %, of MOF relative to the total amount of water-sorption material.

In one or more embodiments, a micro-scale component may include from 1 wt. % to 10 wt. %, in other embodiments, from 5 wt. % to 20 wt. %, in other embodiments, from 10 wt. % to 30 wt. %, in other embodiments, from 20 wt. % to 40 wt. %, in other embodiments, from 20 wt. % to 60 wt. %, in other embodiments, from 30 wt. % to 50 wt. %, of nanoscale silica gel relative to the total amount of water-sorption material.

In one or more embodiments, a micro-scale component may include from 1 wt. % to 10 wt. %, in other embodiments, from 5 wt. % to 20 wt. %, in other embodiments, from 10 wt. % to 30 wt. %, in other embodiments, from 20 wt. % to 40 wt. %, in other embodiments, from 20 wt. % to 60 wt. %, in other embodiments, from 30 wt. % to 50 wt. %, of superabsorbent polymer relative to the total amount of water-sorption material.

As suggested above, a large number of the molecular-scale, water-sorption material molecules are incorporated within a micro-scale component (e.g. polymer, foam, membrane), which may also be referred to as a 3D hierarchical microcellular and open structure, 3D scaffold, or a 3D polymer scaffold.

One example of a technique for incorporating the water-sorption material within a micro-scale component is spinning, such as electrospinning, a polymer solution including the water-sorption material to form a spun polymer containing the water-sorption material.

Another suitable technique would be blowing a foam from a foamable composition including the water-sorption material to form a foam containing the water-sorption material. The water-sorption material might also be incorporated in a membrane to form a membrane containing the water-sorption material. For any of these or other suitable techniques, the cell wall thickness of the water-sorption material can be controlled using the processing technologies to allow for diffusion of water across the cell walls.

The incorporation of the water-sorption material within a micro-scale component may be said to bind the water-sorption material to the micro-scale component. Because of the small atomistic length scale of the water-sorption material, the water-sorption material generally needs to be bound or incorporated within the micro-scale component in order to be further utilized for a practical application. As such, the molecular length scale of the water-sorption material may be said to be linked with the micro-scale component.

For incorporating the water-sorption material within the micro-scale component, the water-sorption material should be exfoliated in order to prevent agglomeration of water-sorption material particles. water-sorption material particles have strong surface area such that the particles tend to want to stick together. In one or more embodiments, the exfoliation of water-sorption material particles may occur inherently as part of an electrospinning or foaming process. In other embodiments, a separate exfoliation step may be utilized. Either way, the exfoliation of the water-sorption material will aid in the dispersion of the exfoliated water-sorption material within the hierarchical component (e.g. polymer solution or foamable composition). The dispersion of the water-sorption material within the micro-scale component may be a substantially uniform or uniform dispersion.

As suggested above, one technique for incorporating the water-sorption material within a micro-scale component is spinning, such as electrospinning. Other spinning techniques for spinning a spinnable composition may also be suitable, such as gel spinning or melt spinning. A spinnable composition generally includes at least one polymer and at least one solvent.

Figure 1:
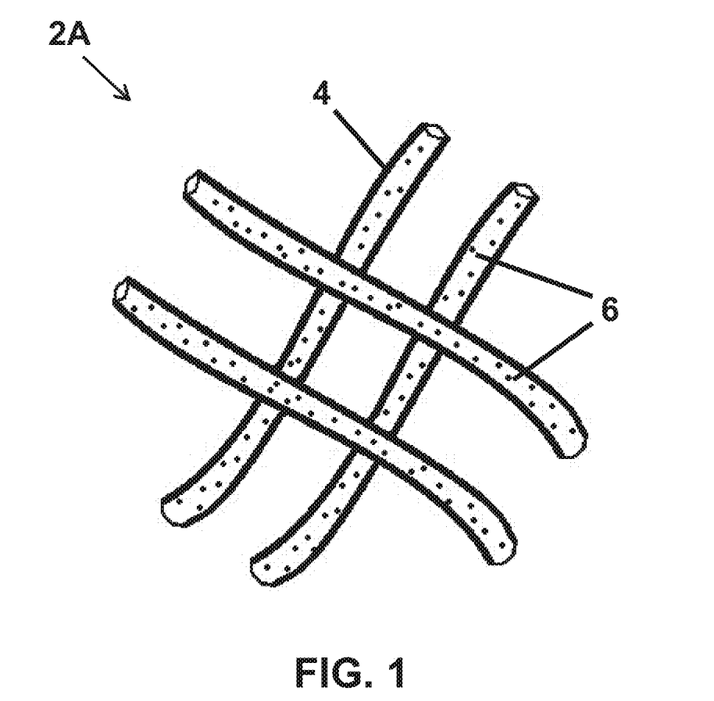
FIG. 1 is a schematic of a spun polymer hierarchical component including a water-sorption material according to one or more embodiments of the invention.

With reference to FIG. 1, hierarchical component 2A, which may also be referred to as spun, water-sorption-material-containing fibers 2A, is shown. A spinnable composition having water-sorption material is utilized to form polymer fibers 4. The water-sorption material will be incorporated into the fibers 4 as incorporated water-sorption material 6, which may be particles. As discussed above, the water-sorption material 6 may also be referred to as being dispersed within the fibers 4.

An electrospinning process generally includes applying a voltage to the spinnable liquid held in a spinning tip or spinneret, which may be similar to a syringe or needle, directed toward a grounded collector. Electrostatic repulsion counteracts the surface tension of the liquid at the tip and a Taylor cone forms from which a stream of liquid, which may be referred to as a jet, erupts toward a collector. The jet elongates and collects on the collector as nanofibers, i.e., fibers with nanometer scale diameters. The collection may be termed a non-woven fabric, as the nanofibers overlap and collect in a sheet-like form.

A melt spinning process generally includes a polymer that can be melted, where the melted polymer solidifies by cooling after being extruded from a spinneret. A gel spinning process generally includes a polymer in a gel state (i.e. only partially liquid), which keeps the polymer chains partially bound together. The produced polymer fiber will then include strong inter-chain forces based on these partial polymer chain bonds. The polymer fibers may be air dried and cooled further in a liquid bath.

The skilled person will be capable of developing suitable spinnable compositions. This may include the use of one or more polymer, one or more solvents, and one or more additives. In one or more embodiments, the water-sorption material can be ultrasonicated in the polymer solution with one or more selected solvents prior to being electrospun into 3D polymer nanofiber scaffolds, for multiplicative porosities and water adsorption capacities.

Polymers for a spinnable composition can be selected from the group consisting of polyurethanes (PU), polycaprolactones (PCL), polyvinyl alcohols (PVA), polymethylmethacrylates (PMMA), poly(vinyldiene fluoride)s (PVDF), polyamides (PA), polyamide-6, polybenzimidazoles (PBI), polycarbonates (PC), polyacrylonitriles (PAN), poly(ethylene-vinyl acetate (EVA), polylactic acids (PLA), polyethylene oxides (PEO), polyethylene terephtalates (PET), polystyrenes (PS), polyvinyphenols (PVP), polyvinylchlorides (PVC), polypropylene, poly(vinylpyrrolidone), cellulose acetates (CA), polyether imides (PEI), polyethylene glycols (PEG), poly(ferrocenyldimethylsilane)s (PFDMS), polyacrylate, polyisobutylene, pressure sensitive adhesives, and mixtures thereof.

Solvents for a spinnable composition can be selected from the group consisting of toluene, tetrahydrofuran (THF), dichloromethane (DCM), chloroform (CHCl3), methanol, dimethylacetamide (DMAC), dimethyl sulfoxide (DMSO), dimethylformamide (DMF), cyclohexane, butanone, xylene, acetone, ethanol, formic acid, distilled water, trifluoracetic acid, hexafluoro-2-propanol, and mixtures thereof.

Additives for a spinnable composition can be selected from the group consisting of tackifiers, surfactants, plasticizers, elastomers, and ionomers.

In one or more embodiments, a spinnable composition can include from 0.01 wt. % to 10 wt. %, in other embodiments, from 1 wt. % to 8 wt. %, in other embodiments, from 2 wt. % to 15 wt. %, in other embodiments, from 1 wt. % to 5 wt. %, of the water-sorption material relative to the total spinnable composition. In one or more embodiments, a spinnable composition can include from 1 wt. % to 50 wt. %, in other embodiments, from 5 wt. % to 40 wt. %, in other embodiments, from 15 wt. % to 50 wt. %, in other embodiments, from 10 wt. % to 30 wt. %, of spinnable polymer relative to the total spinnable composition. In one or more embodiments, a spinnable composition can include from 1 wt. % to 50 wt. %, in other embodiments, from 20 wt. % to 90 wt. %, in other embodiments, from 30 wt. % to 80 wt. %, in other embodiments, from 30 wt. % to 60 wt. %, of solvent relative to the total spinnable composition.

Other aspects of an electrospinning process are disclosed within U.S. Publication 2018/0273805, U.S. Publication US 2018/0327947, and U.S. Pat. No. 9,511,528, which are each incorporated herein by reference.

As suggested above, another suitable technique for incorporating the water-sorption material within a micro-scale component is foam production from a foamable composition. The foam production generally includes using blowing agents to form bubbles and expand the foam. The foam production may include allowing a foam to expand as an expanded foam or extruding the foam as an extruded foam. The foam be either an open-celled foam or a closed-cell foam. The foam may be produced by pouring, extruding, or molding.

Figure 2:
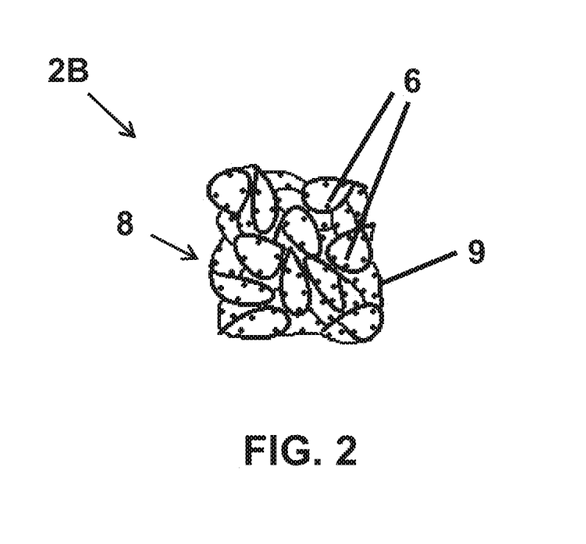
FIG. 2 is a schematic of a foam hierarchical component including a water-sorption material according to one or more embodiments of the invention.

With reference to FIG. 2, hierarchical component 2B, which may also be referred to as a water-sorption-material-containing foam 2B, is shown. A foamable composition having water-sorption material is utilized to form a foam 8 having individual cells formed by cell walls 9. The water-sorption material will be incorporated into the foam cell walls 9 as incorporated water-sorption material 6, which may be particles. As discussed above, the water-sorption material 6 may also be referred to as being dispersed within the foam cell walls 9.

The foam may be a microcellular foam, which may be defined as a polymer including billions of small-sized bubbles. The bubbles of a microcellular foam may be an average of less than 50 microns wide, and in other embodiments, from 0.1 microns to 100 microns wide. Microcellular foam is generally formed by dissolving gas under high pressure into the polymer. The gas bubbles will tend to form in a uniform arrangement based on the thermodynamic instability of the gas bubbles, also known as nucleation.

Suitable blowing agents and other compositional components may be derived for a foaming process including the water-sorption material. Exemplary foamable polymers are polystyrene, ethylene-vinyl acetate, polyethylene, polychloroprene, polyimide, polypropylene, polyurethane, polyethylene, and polyvinyl chloride. The foamable polymer may be an antifouling polymer.

Chemical blowing agents are chemicals that take part in a reaction or decompose, which gives off a chemical in the process. Physical blowing agents are gases that do not chemically react when the foam is made and are therefore inert to the polymer that forms the foam matrix. Exemplary blowing agents are water, CFCs, HCFCs, carbon dioxide, and hydrocarbon blowing agents such as pentane.

The one or more blowing agents may be pre-compounded with the water-sorption material and exfoliated and uniformly dispersed inside an extruder. The extruder can then be used to extrude a foam product, such as a foam panel, for a water harvesting device.

The foam may be characterized by foam density and cell size. Suitable foam densities and cell sizes will be known to the skilled person.

In one or more embodiments, a foamable composition can include from 0.01 wt. % to 10 wt. %, in other embodiments, from 1 wt. % to 8 wt. %, in other embodiments, from 2 wt. % to 15 wt. %, in other embodiments, from 1 wt. % to 5 wt. %, of the water-sorption material relative to the total foamable composition. In one or more embodiments, a foamable composition can include from 1 wt. % to 50 wt. %, in other embodiments, from 5 wt. % to 40 wt. %, in other embodiments, from 15 wt. % to 50 wt. %, in other embodiments, from 10 wt. % to 30 wt. %, in other embodiments, from 20 wt. % to 90 wt. %, in other embodiments, from 30 wt. % to 80 wt. %, in other embodiments, from 30 wt. % to 60 wt. %, of foamable polymer relative to the total foamable composition. Suitable amounts of blowing agent will be known to the skilled person.

As suggested above, the water-sorption material might also be incorporated into a porous membrane as the micro-scale component. As generally known to the skilled person, porous membranes are selective barriers that allow certain components to pass through while stopping others. Where membranes are utilized in embodiments of the present invention, the membranes should have the ability to absorb and/or adsorb water, while also maintaining the ability for subsequent desorption of the water.

For any of the above described water-sorption-material-containing micro-scale components, the micro-scale component may be characterized based on the properties thereof. In one or more embodiments, a water-sorption-material-containing micro-scale component may be characterized by average surface area. In one or more embodiments, average surface area of the water-sorption-material-containing micro-scale component is from 1 $m^2/g$ to 10 $m^2/g$, in other embodiments, from 10 $m^2/g$ to 100 $m^2/g$, and in other embodiments, from 100 $m^2/g$ to 1,000 $m^2/g$, as measured by BET technique.

In one or more embodiments, a water-sorption-material-containing micro-scale component may be characterized by average surface area to volume ratio. Generally speaking, the occupied volume is orders of magnitude larger than the surface area. In one or more embodiments, average surface area to volume ratio of the water-sorption-material-containing micro-scale component is from 50 million $m^{-1}$ to 250 million $m^{-1}$, in other embodiments, from 100 million $m^{-1}$ to 200 million $m^{-1}$, and in other embodiments, from 125 million $m^{-1}$ to 175 million $m^{-1}$, as measured by BET technique for the surface area. In one or more embodiments, average surface area to volume ratio of the water-sorption-material-containing micro-scale component is about 50 million $m^{-1}$, in other embodiments, about 100 million $m^{-1}$, and in other embodiments, about 200 million $m^{-1}$, as measured by BET technique for the surface area.

As suggested above, the micro-scale component (e.g. polymer, foam, membrane) may be incorporated into a housing to thereby form a freshwater harvesting assembly, which may be referred to as a water collection unit. The freshwater harvesting assembly will generally serve to collect a certain amount of water therein, and then subsequently expel the water for suitable use based on a temperature change or an increase in pressure in order to desorb the collected water. Various suitable configurations for the housing may be utilized.

Exemplary housings may include transportation vehicles. These transportation vehicles may carry the water-sorption-material-containing micro-scale component as well as one or more other components that may be necessary for utilization as a freshwater harvesting assembly, which components are further described herein below. Exemplary transportation vehicles include rolling stocks, automobiles, trucks, aircrafts, rotorcrafts, watercrafts, boats, yachts, cruise liners, aerial and sea drones, and oil tankers. The transportation vehicle may be manual, semi-autonomous, or unmanned and fully autonomous.

Other exemplary housings may include energy-generating assemblies. These energy-generating assemblies may carry the water-sorption-material-containing micro-scale component as well as one or more other components that may be necessary for utilization as a freshwater harvesting assembly, which components are further described herein below. Exemplary energy-generating assemblies include windmills, wind farms, solar panels, solar farms, and other actuation, transmission, transduction, and distribution devices that convert wind and solar energies to electricity.

Whether a housing is a transportation vehicle, energy-generating assembly, or other suitable housing, in one or more embodiments the housing generally serves to drive dehumidification of atmospheric airborne particles, moist air, or winds, while at the same time powering the water condensation process with a coolant or refrigerant. Exemplary refrigerants include halocarbon refrigerants, chlorofluorocarbons (CFCs), hydrochlorofluorocarbons (HCFCs), hydrofluorocarbons (HFCs). These refrigerants may by fully or partly halogenated. Other suitable refrigerants include hydrofluoroolefins (HFOs). Particular refrigerants are commonly available under the trade name Freon from The Chemours Company/DuPont, including dichlorodifluoromethane (R-12 or Freon-12). Other specific examples include R-410A and R-134a. Water may also be used as the refrigerant in some embodiments. Other suitable refrigerants include supercritical carbon dioxide, known as R-744, ammonia, and gasses like ethylene, propane, and iso-butane.

Unsaturated water vapor can be saturated by decreasing temperature to the dew point or by increasing pressure. The housings generally serve to saturate water from air within the water-sorption-material-containing micro-scale component. This may further include actively cooling the water-sorption-material-containing micro-scale component. The water-sorption-material-containing micro-scale component provides extraordinarily large surface area to achieve sufficient water harvesting efficiency and water generation rate. The water-sorption-material-containing micro-scale component generally provides a large surface area to volume ratio to aid in condensing water vapor into the liquid phase. The housing may receive a continuous air stream flowing through the system for water deposition and storage.

Figure 3:
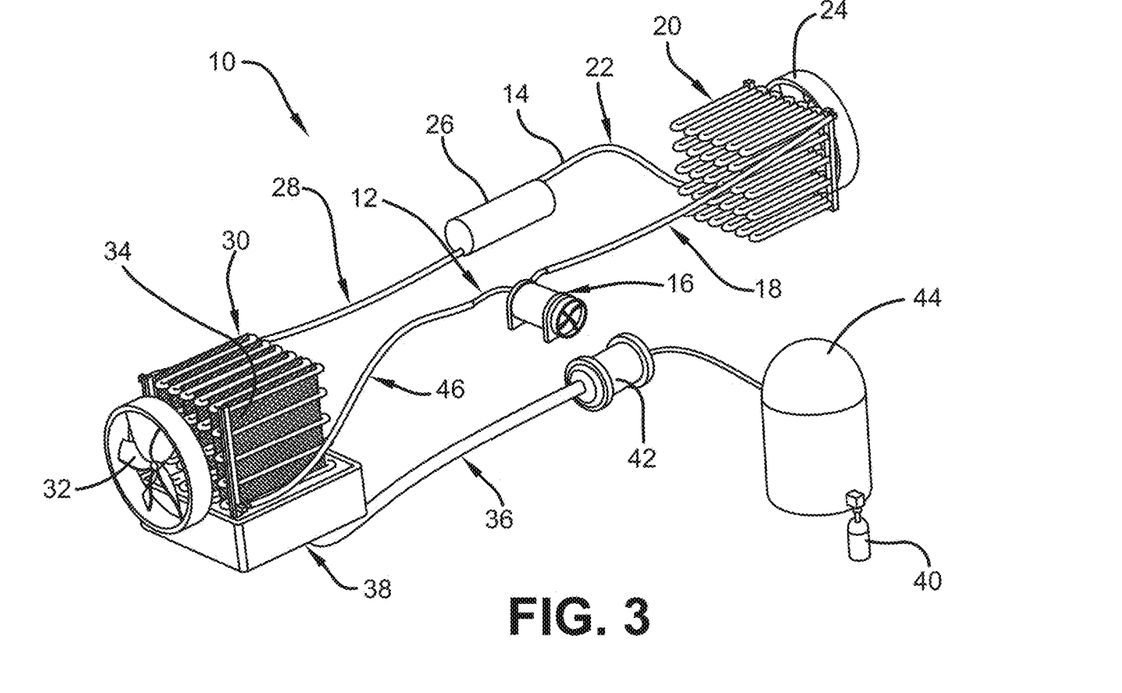
FIG. 3 is a schematic of components of a freshwater harvesting assembly according to one or more embodiments of the invention.

As suggested above, one or more embodiments may utilize housings that operate based on the vapor-compression refrigeration cycle. With reference to FIG. 3, housing components 10, which may also be referred to as a system 10 or a freshwater harvesting assembly 10, provide a device operating according to the vapor compression refrigeration cycle. In the vapor compression refrigeration cycle of system 10, a refrigerant 12 is circulated through a closed circuit 14 for a cycle of condensation and evaporation to produce a cooling effect. Cooling is generally accomplished by the evaporation of the liquid refrigerant 12 at a relatively low pressure. Suitable refrigerants 12 are discussed above.

Refrigerant 12 enters a compressor 16, where the temperature of the refrigerant 12 is elevated by mechanical compression. This turns the refrigerant 12 into a superheated, high pressure vapor 18. The high pressure vapor 18 enters a condenser 20, such as coils thereof, where the vapor 18 condenses to a liquid 22 and the resultant heat is dissipated to the surroundings. Condenser 20 may include a fan 24 for providing active dissipation of the resultant heat. Condenser 20 is shown with five rows and six columns, and in other embodiments may have other suitable numbers of rows and columns of coils, including any variety of one, two, three, four, five, and six for each of the rows and columns.

The resultant high pressure liquid 22 then passes through an expansion device 26, which may be an expansion valve, in order to lower the fluid pressure and temperature. The low-pressure fluid 28 enters an evaporator 30, such as coils thereof, where low-pressure fluid 28 evaporates by absorbing heat from the cooled space. Evaporator 30 may include a fan 32 for providing active dissipation. Evaporator 30 is shown with five rows and six columns, and in other embodiments may have other suitable numbers of rows and columns of coils, including any variety of one, two, three, four, five, and six for each of the rows and columns.

Evaporator 30 includes a water-sorption-material-containing micro-scale component 34 (e.g. polymer, foam, membrane), which is the micro-scale component disclosed above. Water-sorption-material-containing micro-scale component 34 may be provided within the interstices between the coils of evaporator 30. As disclosed herein, water-sorption-material-containing micro-scale component 34 absorbs and/or adsorbs water from the surrounding environment. As air from the surrounding environment flows across the evaporator 30 and the water-sorption-material-containing micro-scale component 34, the water vapor in the air is cooled below its dew point to become liquid water 36. This is also driven by the transfer of heat from water-sorption-material-containing micro-scale component 34 to low-pressure fluid 28 within evaporator 30. Thus, liquid water 36, in the form of condensation, is obtained as a byproduct of the vapor compression refrigeration cycle by way of the water-sorption-material-containing micro-scale component 34.

The liquid water 36 may be collected by a condensed water collection device 38, which may also be referred to as a temporary water reservoir 38, which may further include a pump, for providing, and optionally pumping, the liquid water 36 to a use location 40. Condensed water collection device 38 is disposed below evaporator 30 to collect the condensed liquid water 36. Condensed water collection device 38 may include a funnel (not seen) for funneling liquid water 36 to a particular collection location.

The large surface area and material of water-sorption-material-containing micro-scale component 34 may independently make virus and bacteria hard to survive thereon. Thus the water condensed and purified by water-sorption-material-containing micro-scale component 34 may be immediately drinkable in some embodiments.

In one or more embodiments, before passing to use location 40, liquid water 36 may enter a filter 42, such as a reverse osmosis filter, for removing impurities from liquid water 36. Exemplary filter media include reverse osmosis membranes made of rolled polyamide, polysulfone, and polyester filter media.

Before passing to use location 40, and after filter 42 where utilized, liquid water 36 may be stored in a water storage location 44, which may also be referred to as temporary storage 44, which may be a storage tank. The use location 40 may include a valve or other open-and-close mechanism for selectively releasing the liquid water 36.

Where a storage location, such as storage location 44, is utilized, a step of storing may be characterized by a particular timeframe for storing the collected water. In one or more embodiments, collected water can be stored for at least 1 hour, in other embodiments, for at least 1 day, in other embodiments, for at least 1 week, and in other embodiments, for at least 1 month.

Turning back to the completion of the vapor compression refrigeration cycle, the resultant vapor 46 from the evaporator 30 then reenters the compressor 16. The vapor compression refrigeration cycle can then be repeated by providing high pressure vapor 18 back to condenser 20.

In one or more embodiments, system 10 may be devoid of a water storage tank. For example, the liquid water 36 might continuously enter a use location 40, which may also be referred to as a collection location 40, that may be a bottle or cup. Once a sufficient amount of water in use location 40 is collected, the water 36 could be used. Where relatively smaller amounts of water 36 may be desired, a water storage tank may not be necessary.

As suggested above, additionally or alternatively to the use of fans 24, 32, the flow of air across condenser 20 and/or evaporator 30 could be driven by wind that is constantly encountered by system 10. For example, system 10 can be provided within the vehicles described above. Based on the constant motion of the vehicle, system 10 can constantly encounter wind that can serve as driven air across condenser 20 and/or evaporator 30.

As suggested above, freshwater harvesting assembly 10 may be powered by a green energy source, such as wind energy or solar energy. The green energy source can be used to power any or all of compressor 16, fan 24, fan 32, and a pump of condensed water collection device 38.

As suggested above, all components of freshwater harvesting assembly 10 may be miniaturized. In one or more embodiments, all components of freshwater harvesting assembly 10 may be in the nanoscale. In one or more embodiments, all components of freshwater harvesting assembly 10 may be in the microscale.

Figure 4:
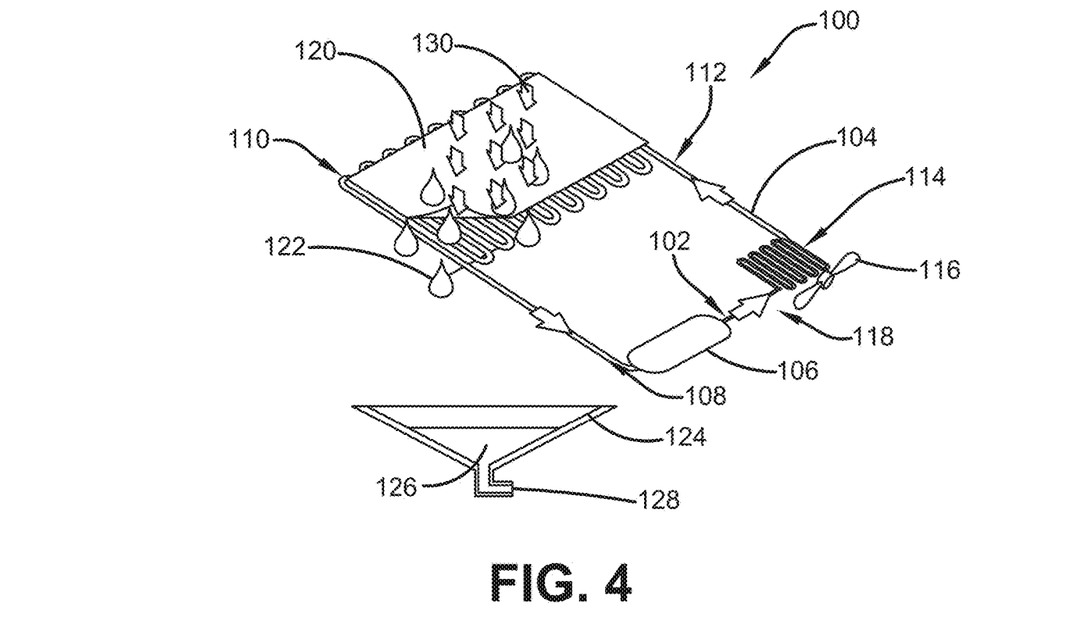
FIG. 4 is a schematic of components of a freshwater harvesting assembly according to one or more embodiments of the invention.

With reference to FIG. 4, housing components 100, which may also be referred to as a system 100 or a freshwater harvesting assembly 100, provide a refrigeration device operating according to the vapor compression refrigeration cycle. The system 100 of FIG. 4 is in many respects similar to the system 10 and the relevant description on system 10 is therefore also incorporated here. In the vapor compression refrigeration cycle of system 100, a refrigerant 102 is circulated through a closed circuit 104 for a cycle of condensation and evaporation to produce a cooling effect. Suitable refrigerants 102 are discussed above.

Refrigerant 102 enters a compressor 106, and superheated, high pressure vapor 118 enters a condenser 114, such as coils thereof. Vapor 118 condenses to a liquid 112 and the resultant heat is dissipated to the surroundings. Condenser 114 may include a fan 116 for providing active dissipation of the resultant heat. Condenser 114 is shown with one row and four columns, and in other embodiments other suitable numbers of rows and columns of coils may be utilized.

The resultant liquid 112, which may optionally pass through an expansion device (not shown) in order to lower the fluid pressure and temperature, enters an evaporator 110, such as coils thereof. In evaporator 110, low-pressure fluid 112 evaporates by absorbing heat from the cooled space. Evaporator 110 may include a fan (not shown) for providing active dissipation. Evaporator 110 is shown with one row and nine columns, and in other embodiments other suitable numbers of rows and columns of coils may be utilized.

Evaporator 110 includes a water-sorption-material-containing micro-scale component 120 (e.g. polymer, foam, membrane), which is the micro-scale component disclosed above. Water-sorption-material-containing micro-scale component 120 may be provided above the coils of evaporator 110. As disclosed herein, water-sorption-material-containing micro-scale component 120 absorbs and/or adsorbs water from the surrounding environment.

As air 130 from the surrounding environment flows across the evaporator 110 and the water-sorption-material-containing micro-scale component 120, the water vapor is cooled below its dew point to become liquid water 122. This is also driven by the transfer of heat from water-sorption-material-containing micro-scale component 120 to low-pressure fluid 112 within evaporator 110. Thus, liquid water 122, in the form of condensation, is obtained as a byproduct of the vapor compression refrigeration cycle by way of the water-sorption-material-containing micro-scale component 120.

The liquid water 122 may be collected by a condensed water collection device 124, which may also be referred to as a temporary water reservoir 124, for providing the collected liquid water 126 to a use location 128. Condensed water collection device 124 is disposed below evaporator 110 to collect the condensed liquid water 126. Condensed water collection device 124 may be shaped as a funnel for funneling liquid water 126 to use location 128.

The large surface area and material of water-sorption-material-containing micro-scale component 34 may independently make virus and bacteria hard to survive thereon. Thus the water condensed and purified by water-sorption-material-containing micro-scale component 120 may be immediately drinkable in some embodiments.

In one or more embodiments, before passing to use location 128, liquid water 126 may enter a filter, such as a reverse osmosis filter, for removing impurities from liquid water 126. Liquid water 126 may be stored in a water storage location such as a storage tank. The use location 128 may include a valve or other open-and-close mechanism for selectively releasing the liquid water 126. In one or more embodiments, collected water can be stored for at least 1 hour, in other embodiments, for at least 1 day, in other embodiments, for at least 1 week, and in other embodiments, for at least 1 month.

Turning back to the completion of the vapor compression refrigeration cycle, the resultant vapor 108 from the evaporator 110 then reenters the compressor 106. The vapor compression refrigeration cycle can then be repeated by providing high pressure vapor 118 back to condenser 114.

In one or more embodiments, system 100 may be devoid of a water storage tank. For example, the liquid water 36 might continuously enter use location 128 for consumption by a user.

As suggested above, additionally or alternatively to the use of fans, the flow of air across condenser 114 and/or evaporator 110 could be driven by wind that is constantly encountered by system 100. For example, system 10 can be provided within the vehicles described above. Based on the constant motion of the vehicle, system 100 can constantly encounter wind that can serve as driven air across condenser 114 and/or evaporator 110.

As suggested above, freshwater harvesting assembly 100 may be powered by a green energy source, such as wind energy or solar energy. The green energy source can be used to power any or all of compressor 106, fan 116, and an evaporator fan.

As suggested above, all components of freshwater harvesting assembly 100 may be miniaturized. In one or more embodiments, all components of freshwater harvesting assembly 100 may be in the nanoscale. In one or more embodiments, all components of freshwater harvesting assembly 100 may be in the microscale.

Figure 5:
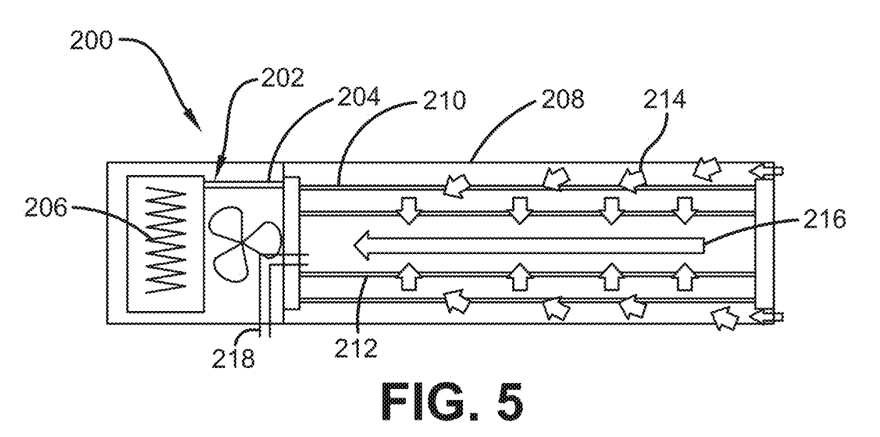
FIG. 5 is a schematic of components of a freshwater harvesting assembly according to one or more embodiments of the invention.

With reference to FIG. 5, housing components 200, which may also be referred to as a system 200 or a freshwater harvesting assembly 200, provide a refrigeration device operating according to the vapor compression refrigeration cycle. The system 200 of FIG. 5 is in many respects similar to the systems 10, 100 and the relevant description on system 10, 100 is therefore also incorporated here.

In the vapor compression refrigeration cycle of system 200, a refrigerant 202 is circulated through a closed circuit 204 for a cycle of condensation and evaporation to produce a cooling effect. Suitable refrigerants 202 are discussed above.

Refrigerant 202 passes from a refrigerant condenser 206 to a housing 208 that includes an evaporator 210, which can be a nanofiber evaporator 210. Housing 208 also includes a water-sorption-material-containing micro-scale component 212 within evaporator 210.

As air 214 from the surrounding environment flows across the evaporator 210 and the water-sorption-material-containing micro-scale component 212, the water vapor in the air 214 is cooled below its dew point to become liquid water 216. Thus, liquid water 216, in the form of condensation, is obtained as a byproduct of system 200 by way of the water-sorption-material-containing micro-scale component 212. The liquid water 216 may be collected at a use location 218, which may be a collection tube 218 having a first opening within housing 208 and a second opening outside housing 208 for collecting the water 216 therefrom.

Figure 6:
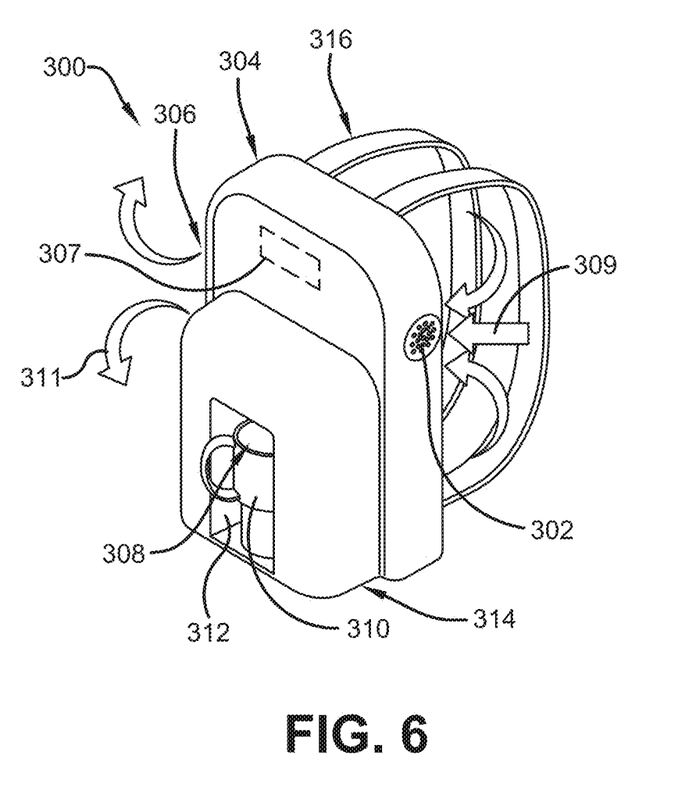
FIG. 6 is a schematic of a backpack housing of a freshwater harvesting assembly according to one or more embodiments of the invention.

With reference to FIG. 6, an exemplary housing 300 is shown. Housing 300, which may also be referred to as a freshwater harvesting assembly 300, includes an air inlet location 302 for receiving air 309 having water vapor therein. The air 309 passes through a storage location 304, which may also be referred to as a central portion 304, of housing 300, and exits at an air outlet location 306 positioned opposite the air inlet location 302 as drier air 311.

Storage location 304 includes a water-sorption-material-containing micro-scale component 307. Water-sorption-material-containing micro-scale component 307 is in the flow path from air inlet location 302 to air outlet location 306. As moist air 309 from the surrounding environment flows across water-sorption-material-containing micro-scale component 307, the water vapor in the air 309 is adsorbed and/or absorbed into water-sorption-material-containing micro-scale component 307.

In one or more embodiments, the water vapor adsorbed and/or absorbed into water-sorption-material-containing micro-scale component 307 can be extracted by a vapor compression refrigeration cycle as discussed above, with the necessary components being provided within storage location 304.

In these or other embodiments, the water vapor adsorbed and/or absorbed into water-sorption-material-containing micro-scale component 307 can be extracted by applying heat to the water-sorption-material-containing micro-scale component 307. A suitable amount of heat, without being too much heat as to cause decomposition of the water-sorption-material-containing micro-scale component 307, causes desorption of the water within the water-sorption-material-containing micro-scale component 307. The heat can be provided from a green energy source (not shown), such as wind energy or solar energy.

The liquid water from desorption of the water within the water-sorption-material-containing micro-scale component 307 may be collected from water-sorption-material-containing micro-scale component 307 at a collection location 308. Collection location 308 may include a cup 310 that is positioned within a storage location 312 of housing 300. Collection location 308 may be within a front portion 314 of backpack 300.

As shown in FIG. 6, housing 300 may be a backpack 300. Backpack 300 may include a pair of straps 316 for being carried on the back of a user.

Figure 7:
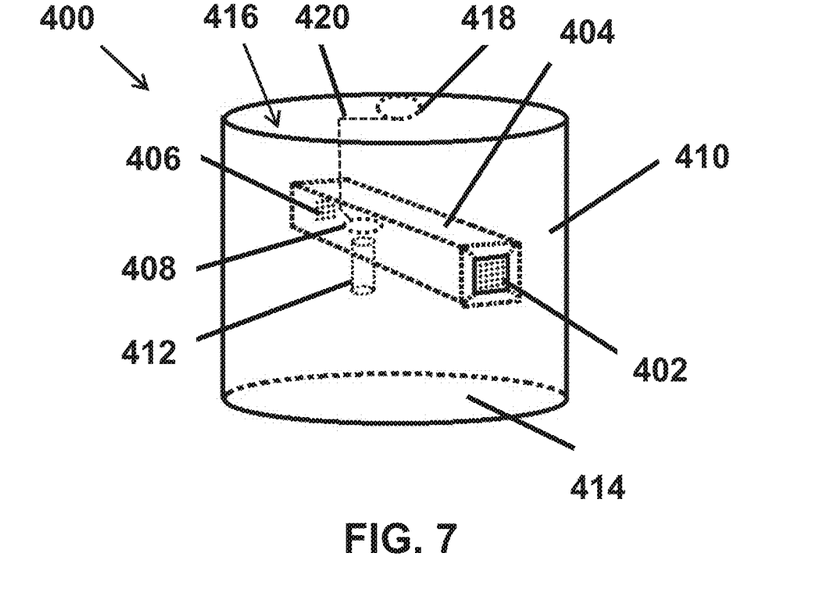
FIG. 7 is a schematic of a cup housing of a freshwater harvesting assembly according to one or more embodiments of the invention.

With reference to FIG. 7, an exemplary housing 400 is shown. Housing 400, which may also be referred to as a freshwater harvesting assembly 400 or cup 400 or mug 400, includes an air inlet location 402 for receiving air having water vapor therein. The air passes through a storage location 404 of housing 400 and exits at an air outlet location 406 positioned opposite the air inlet location 402 as drier air.

Storage location 404 includes a water-sorption-material-containing micro-scale component 408. Water-sorption-material-containing micro-scale component 408 is in the flow path from air inlet location 402 to air outlet location 406. As moist air from the surrounding environment flows across water-sorption-material-containing micro-scale component 408, the water vapor in the air is adsorbed and/or absorbed into water-sorption-material-containing micro-scale component 408.

Storage location 404 passes from a first portion of sidewall 410 of cup 400 to a second portion of sidewall 410 of cup 400. In one or more embodiments, storage location 404 may be positioned corresponding to the diameter of cup 400. Storage location 404 may be square or rectangular prism shaped as shown, or may be another suitable shape such as cylindrical.

Storage location 404 includes a water collection location 412 extending from a bottom surface thereof. Water collection location 412, which may be a collection tube 412 having a first opening within storage location 404 and a second opening outside storage location 404, to allow collected water to pass from storage location 404 to a bottom 414 of cup 400. Once sufficient water has collected in bottom 414 of cup 400, a user can drink the collected water from an open end 416 of cup 400.

In one or more embodiments, the water vapor adsorbed and/or absorbed into water-sorption-material-containing micro-scale component 408 can be extracted by a vapor compression refrigeration cycle as discussed above, with the necessary components being provided within storage location 404.

In these or other embodiments, the water vapor adsorbed and/or absorbed into water-sorption-material-containing micro-scale component 408 can be extracted by applying heat to the water-sorption-material-containing micro-scale component 408. A suitable amount of heat, without being too much heat as to cause decomposition of the water-sorption-material-containing micro-scale component 408, causes desorption of the water within the water-sorption-material-containing micro-scale component 408. The heat can be provided from a green energy source 418, such as a wind turbine 418 or solar panel 418, for providing wind energy or solar energy. Green energy source 418 can be coupled, such as by electrical wire 420, with water-sorption-material-containing micro-scale component 408 for applying heat to water-sorption-material-containing micro-scale component 408 for the desorption of water. Electrical wire 420 may extend from green energy source 418 to water-sorption-material-containing micro-scale component 408 entirely outside of the drinking or water-receiving area of cup 400. Electrical wire 420 may extend along the outside of sidewall 410 for a first length, and then extend into storage location 404. Green energy source 418 can be positioned in any suitable location of cup 400, and is shown as being positioned outside sidewall 410 just below open end 416.

Figure 8:
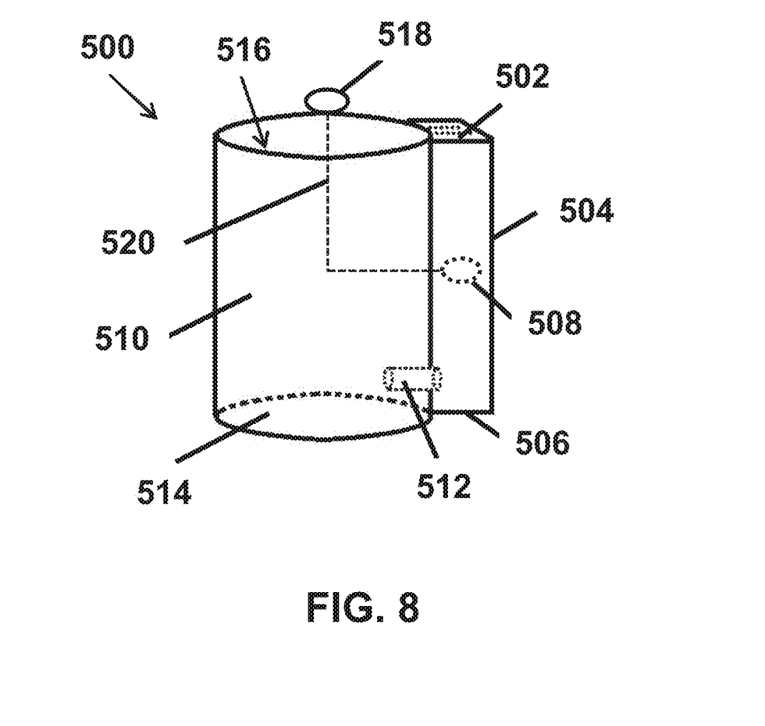
FIG. 8 is a schematic of an alternate cup housing of a freshwater harvesting assembly according to one or more embodiments of the invention.

With reference to FIG. 8, an exemplary housing 500 is shown. Housing 500, which may also be referred to as a freshwater harvesting assembly 500 or cup 500 or mug 500, includes an air inlet location 502 for receiving air having water vapor therein. The air passes through a storage location 504 of housing 500 and exits at an air outlet location 506 positioned opposite the air inlet location 502 as drier air.

Storage location 504 includes a water-sorption-material-containing micro-scale component 508. Water-sorption-material-containing micro-scale component 508 is in the flow path from air inlet location 502 to air outlet location 506. As moist air from the surrounding environment flows across water-sorption-material-containing micro-scale component 508, the water vapor in the air is adsorbed and/or absorbed into water-sorption-material-containing micro-scale component 508.

Storage location 504 is coupled with sidewall 510 of cup 500. In one or more embodiments, storage location 504 may be adhered with sidewall 510 with a suitable adhesive. In one or more embodiments, storage location 504 may be formed unitarily with sidewall 510. In one or more embodiments, storage location 504 may be of a similar height as the height of cup 500. Storage location 504 may be square or rectangular prism shaped as shown, or may be another suitable shape such as cylindrical.

Storage location 504 includes a water collection location 512 extending from an inner surface thereof, with inner surface being defined as relative to sidewall 510. Water collection location 512, which may be a collection tube 512 having a first opening within storage location 504 and a second opening outside storage location 504, to allow collected water to pass from storage location 504 to a bottom 514 of cup 500. Once sufficient water has collected in bottom 514 of cup 500, a user can drink the collected water from an open end 516 of cup 500.

In one or more embodiments, the water vapor adsorbed and/or absorbed into water-sorption-material-containing micro-scale component 508 can be extracted by a vapor compression refrigeration cycle as discussed above, with the necessary components being provided within storage location 504.

In these or other embodiments, the water vapor adsorbed and/or absorbed into water-sorption-material-containing micro-scale component 508 can be extracted by applying heat to the water-sorption-material-containing micro-scale component 508. A suitable amount of heat, without being too much heat as to cause decomposition of the water-sorption-material-containing micro-scale component 508, causes desorption of the water within the water-sorption-material-containing micro-scale component 508. The heat can be provided from a green energy source 518, such as a wind turbine 518 or solar panel 518, for providing wind energy or solar energy. Green energy source 518 can be coupled, such as by electrical wire 520, with water-sorption-material-containing micro-scale component 508 for applying heat to water-sorption-material-containing micro-scale component 508 for the desorption of water. Electrical wire 520 may extend from green energy source 518 to water-sorption-material-containing micro-scale component 508 entirely outside of the drinking or water-receiving area of cup 500. Electrical wire 520 may extend along the outside of sidewall 510 for a first length, and then extend into storage location 504. Green energy source 518 can be positioned in any suitable location of cup 500, and is shown as being positioned just above open end 516.

It should be appreciated that suitable aspects of the above disclosed particular housings may be used interchangeably.

Any of the herein described freshwater harvesting assemblies may be utilized to harvest freshwater from any suitable water-vapor-containing environments. This may include an outdoor environment. In other embodiments, the freshwater harvesting assemblies may be utilized to harvest freshwater from an office or a household setting. This may be particularly suitable where the housing is relatively smaller, such as a cup housing or mug housing.

Any of the herein described freshwater harvesting assemblies may be characterized based on water collection rate. In one or more embodiments, a freshwater harvesting assembly has a water collection rate of from 1 gallon per hour to 20 gallons per hour, in other embodiments, from 0.5 gallons per hour to 5 gallons per hour, in other embodiments, from 2 gallons per hour to 15 gallons per hour, in other embodiments, from 1 gallon per hour to 10 gallons per hour, and in other embodiments, from 5 gallons per hour to 10 gallons per hour. In one or more embodiments, a freshwater harvesting assembly has a water collection rate of at least 0.5 gallon per hour, in other embodiments, at least 1 gallon per hour, in other embodiments, at least 5 gallons per hour, in other embodiments, at least 10 gallons per hour, and in other embodiments, at least 15 gallons per hour.

Any of the herein described freshwater harvesting assemblies may be characterized based on water harvesting efficiency. Calculation of water harvesting efficiency may be based on the equation $WHE=W/(S*t)$, where W is the weight of the harvested water, S is the capture area, and t is the collection time. The water harvesting efficiency can therefore be defined as the weight of collected water per hour per unit area.

In one or more embodiments, a freshwater harvesting assembly has a water harvesting efficiency of from 300 mg/(cm$^2$*h) to 1,000 mg/(cm$^2$*h), in other embodiments, from 300 mg/(cm$^2$*h) to 10,000 mg/(cm$^2$*h), in other embodiments, from 1,000 mg/(cm$^2$*h) to 10,000 mg/(cm$^2$*h), in other embodiments, from 100,000 mg/(cm$^2$*h) to 1,000,000 mg/(cm$^2$*h), and in other embodiments, from 1,000,000 mg/(cm$^2$*h) to 10,000,000 mg/(cm$^2$*h). In one or more embodiments, a freshwater harvesting assembly has a water harvesting efficiency of at least 300 mg/(cm$^2$*h), in other embodiments, at least 1,000 mg/(cm$^2$*h), and in other embodiments, at least 10,000 mg/(cm$^2$*h).

Methods disclosed herein for using any of the herein described freshwater harvesting assemblies may be characterized based on relative humidity of the air. In one or more embodiments, the air may have a relative humidity of from 5% to 99%, in other embodiments, from 15% to 80%, in other embodiments, from 15% to 40%, in other embodiments, from 30% to 60%, in other embodiments, from 40% to 80%, and in other embodiments, from 25% to 65%.

In light of the foregoing, it should be appreciated that the present invention significantly advances the art by providing an improved freshwater harvesting assembly. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A freshwater harvesting assembly comprising
a micro-scale component, wherein the micro-scale component includes a polymer selected from electrospun polymer fibers and gel spun polymer fibers;
a water-sorption material selected from metal-organic framework (MOF), nanosilica gel, and superabsorbent polymer;
wherein the water-sorption material is incorporated within the micro-scale component to thereby provide a water-sorption-material-containing micro-scale component; and
a housing carrying the water-sorption-material-containing micro-scale component, wherein the housing is an evaporator of a vapor compression refrigeration cycle system, the evaporator including coils having interstices therebetween, wherein the micro-scale component is provided within the interstices between the coils.

2. The freshwater harvesting assembly of claim 1, wherein the housing is selected from a backpack, a cup, and a vehicle, the vehicle being selected from automobiles, watercraft, aircraft, aerial drones, and sea drones.

3. The freshwater harvesting assembly of claim 1, wherein the freshwater harvesting assembly is capable of collecting at least 0.5 gallons of water per hour.

4. The freshwater harvesting assembly of claim 1, wherein the freshwater harvesting assembly is capable of collecting at least 10 gallon of water per hour.

5. The freshwater harvesting assembly of claim 1, wherein the water-sorption material is the metal-organic framework.

6. The freshwater harvesting assembly of claim 1, wherein the water-sorption material is the metal-organic framework and is selected from the group consisting of MOF-841, Cr-MIL-101, Co$_2$Cl$_2$(BTDD), Zr-MOF-808, Al-MIL-53, Ti-MIL-125, Zr-UiO-66, Ti-MIL-125-NH$_2$, Zr-UiO-66-NH$_2$, Zn-ZIF-8, and Cu-HKUST-1.

7. The freshwater harvesting assembly of claim 1, wherein the polymer is the electrospun polymer fibers.

8. The freshwater harvesting assembly of claim 1, wherein the freshwater harvesting assembly is powered by a green energy source selected from wind energy and solar energy.

9. A freshwater harvesting assembly comprising
a micro-scale component, wherein the micro-scale component includes a polymer selected from electrospun polymer fibers and gel spun polymer fibers;
a water-sorption material selected from metal-organic framework (MOF), nanosilica gel, and superabsorbent polymer, wherein the water-sorption material includes from 60 wt. % to 80 wt. % of the metal-organic framework and from 20 wt. % to 40 wt. % of either the nanosilica gel or the superabsorbent polymer;
wherein the water-sorption material is incorporated within the micro-scale component to thereby provide a water-sorption-material-containing micro-scale component; and
a housing carrying the water-sorption-material-containing micro-scale component.

* * * * *